United States Patent [19]

Fox et al.

[11] 4,150,858
[45] Apr. 24, 1979

[54] TENSIONED CUSHIONING LUG FOR TRACK-TYPE VEHICLES

[75] Inventors: Lawrence E. Fox, Peoria; Eugene R. Groff, Chillicothe; Paul L. Wright, Peoria, all of Ill.

[73] Assignee: Caterpillar Tractor Co., Peoria, Ill.

[21] Appl. No.: 869,561

[22] Filed: Jan. 16, 1978

[51] Int. Cl.² ............................................. B62D 55/20
[52] U.S. Cl. ..................................... 305/57; 267/63 R
[58] Field of Search ............................. 305/12, 11, 57; 267/63 R, 153

[56] References Cited
U.S. PATENT DOCUMENTS 3,887,244  6/1975  Haslett ................................. 305/57

*Primary Examiner*—John P. Shannon
*Attorney, Agent, or Firm*—Phillips, Moore, Weissenberger, Lempio & Majestic

[57] ABSTRACT

An endless track assembly for a track-type vehicle comprises a plurality of track shoes secured to an articulated chain. The links of the chain are pivotally interconnected together by pin and bushing assemblies adapted to engage a drive sprocket of the vehicle. A cushioning lug is secured to each track shoe, intermediate each pair of adjacent pin and bushing assemblies, for attenuating the noise level of the track assembly upon engagement therewith with the drive sprocket. Each cushioning lug assembly comprises a resilient cushioning block composed of an elastomeric material, a cap mounted on the cushioning block and a tensioned cable secured between the cap and a respective one of the track shoes. A ball secured to the upper end of the cable may be connected to the cap by an annular retainer formed integrally with the cap, or by a separate member secured to the cap and covered by a plug.

28 Claims, 10 Drawing Figures

TENSIONED CUSHIONING LUG FOR TRACK-TYPE VEHICLES

BACKGROUND OF THE INVENTION

This invention relates to an endless track assembly for a track-type vehicle having a cushioning lug secured to each track shoe thereof to attenuate the noise level of the track assembly during operation.

A conventional track assembly comprises a plurality of track shoes secured to an articulated chain with the chain adapted to engage a drive sprocket. Engagement of the chain with the drive sprocket gives rise to high noise levels. In addition, engagement of drive bushings of the chain with the sprocket tends to unduly wear the bushings whereby they require periodic repair or replacement.

One solution to this problem may be found in U.S. Pat. No. 3,887,244, assigned to the assignee of this application, wherein a combined cushioning and impact lug is secured to each track shoe of the track assembly to reduce noise levels thereof.

As further disclosed in such patent, it has proven desirable to fully protect an elastomeric block of the cushioning lug to extend the service life thereof by covering it with a wear-resistant metallic cap. The cap is normally bonded to the block or is bolted to a track shoe, the latter arrangement being disclosed in U.S. Pat. No. 3,897,980, also assigned to the assignee of this application. Such prior art arrangements may tend to limit the desired multi-directional movement of the cap, which would otherwise insure substantial and continuous bearing contact as between the cap and the teeth of the drive sprocket.

SUMMARY OF THIS INVENTION

The present invention is directed to overcoming one or more of the problems as set forth above.

The improved cushioning lug means of this invention comprises a resilient spring means having a cap means mounted thereon adapted to engage the teeth of a drive sprocket. A connecting means, comprising a non-rigid and flexible member exhibiting multi-directional flexiblity, is adapted to be secured and tensioned between a track shoe of an endless track assembly and the cap means for preloading the spring means and for permitting multi-directional movement of the cap means. As described hereinafter, the cushioning lug means of this invention insures optimum bearing contact with the teeth of the drive sprocket to substantially attenuate noise levels, provides for the "self-cleaning" of the sprocket teeth, exhibits a substantial fatigue or service life and may be pre-adjusted to compensate for any mismatch relative to the sprocket teeth.

BRIEF DESCRIPTION OF THE DRAWINGS

Other objects of this invention will become apparent from the following description and accompanying drawings wherein.

DETAILED DESCRIPTION

Figure 1:
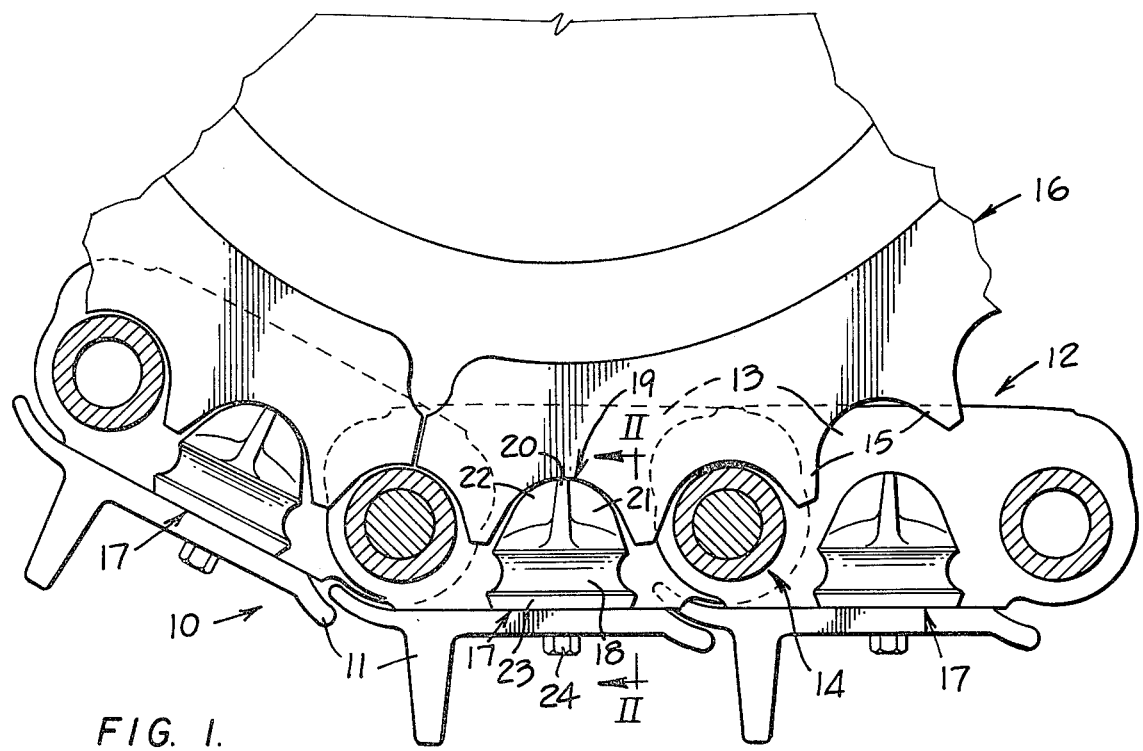
FIG. 1 is a partially sectioned side elevational view of an endless track assembly for a track-type vehicle, shown engaging a drive sprocket and having a plurality of cushioning lugs embodying this invention employed therein.

Referring to FIG. 1, an endless track assembly 10 comprises a plurality of track shoes 11 secured to an articulated chain 12 in a conventional manner. Laterally spaced pairs of links 13 of the chain are pivotally interconnected by a pin and bushing assembly 14. Each pin and bushing assembly is adapted to engage within a notch or root defined between each circumferentially adjacent pair of teeth 15 of a sprocket 16 for driving the track assembly in a conventional manner.

Figure 3:
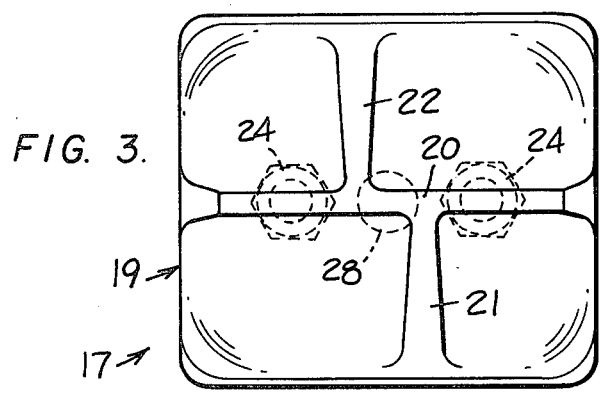
FIG. 3 is a top plan view of the cushioning lug, taken in the direction of arrows III—III in FIG. 2.
Figure 4:
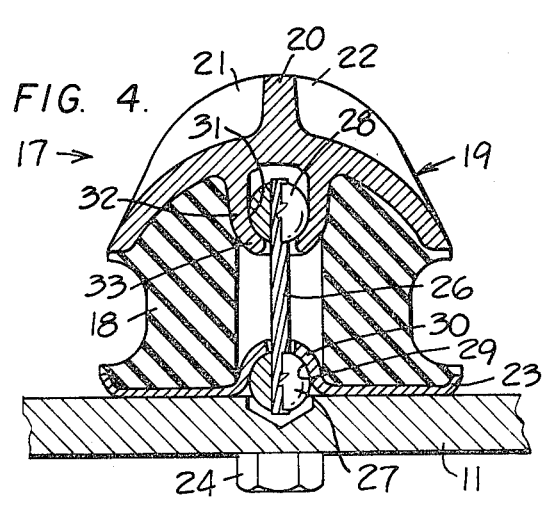
FIG. 4 is a cross sectional view of the cushioning lug, taken in the direction of arrows IV—IV in FIG. 2.
Figure 2:
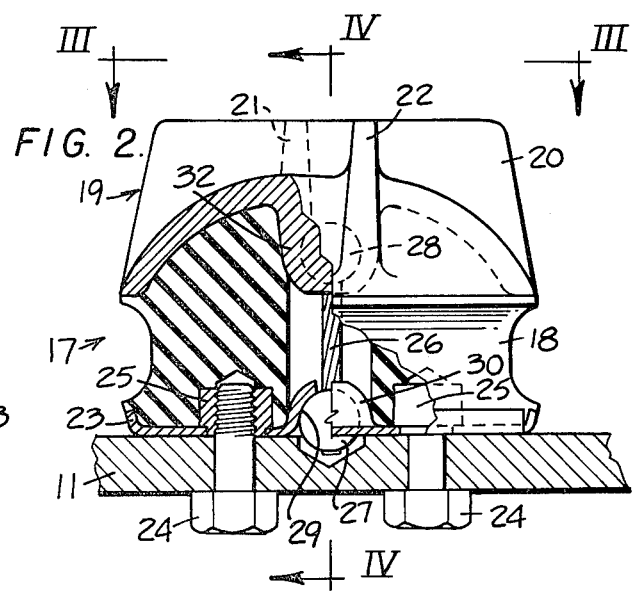
FIG. 2 is an enlarged end elevational and partially sectioned view of one of the cushioning lugs, taken in the direction of arrows II—II in FIG. 1.

This invention relates to a cushioning lug means 17 secured to each track shoe 11 and disposed intermediate (midpitch) adjacent pairs of pin and bushing assemblies 14 for attenuating the noise level of the track assembly and to insure continuous cleaning of the sprocket teeth. Referring to FIGS. 2-4, each cushioning lug means comprises a resilient spring means or cushioning block 18 suitably composed of an elastomeric material, such as rubber. A hardened metallic cap means 19 is mounted on the cushioning block and is adapted to engage the root defined between each pair of circumferentially adjacent teeth 15 of sprocket 16, as shown in FIG. 1. The cap means comprises a transversely extending cleaning and reinforcing flange 20 and a pair of offset drive or bearing flanges 21 and 22, secured on either side of the reinforcing flange.

As more clearly shown in FIG. 2, a mounting plate 23 is disposed on track shoe 11 and secured thereon by a pair of bolts 24 and nuts 25, the latter being embedded in cushioning block 18. Block 18 is preferably bonded or otherwise suitably secured between the plate and cap means 19. A flexible cable or connecting means 26 is secured in tension between the mounting plate and the cap means for permitting multidirectional movement of the cap means on cushioning block 18 which is preloaded or compressed therebetween.

Cable 26 preloads cushioning block 18 which helps in precluding bond failure between the block and cap means 19 and plate 23. The placement of the elastomeric block under compression increases fatigue life and controls the height of the lug which tends to minimize the sprocket to lug mismatch.

The cable may be composed of braided filament material, such as steel, and has a pair of lower and upper anchoring members or balls 27 and 28, respectively, secured on either end thereof. Alternatively, the cable could be replaced with a flexible steel spring having balls 27 and 28 secured to opposite ends thereof. Although it is preferable to allow flexing of connecting means 26, the cable could be replaced by a bolt having spherical ends for universally connecting the bolt between the track shoe and cap means.

Ball 27 is disposed in a semi-spherical first socket 29 defined in a crimped retainer 30 of mounting plate 23. Ball 28 is mounted in a semi-spherical second socket 31, defined in a swaged or otherwise suitably formed generally annular retainer 32, formed integrally with one-piece cap means 19 and having bent annular flange means 33 for retaining ball 28 therein. It should be noted that the cap means proper covers socket 31 to prevent upward movement of ball 28. Although cable 26 is preferably interconnected between cap means 19 and plate 23 by the above-described ball and socket connections, it should be understood that other well known universal connections could be utilized in lieu thereof.

FIGS. 5, 6, 7-9 and 10 illustrate modified cushioning lugs 17a, 17b, 17c and 17d, respectively. In each modification, identical numerals depict corresponding constructions. The FIGS. 5-10 embodiments essentially differ from the FIGS. 1-4 embodiment in the manner by which ball 28 is attached and anchored to each respective cap means.

Figure 5:
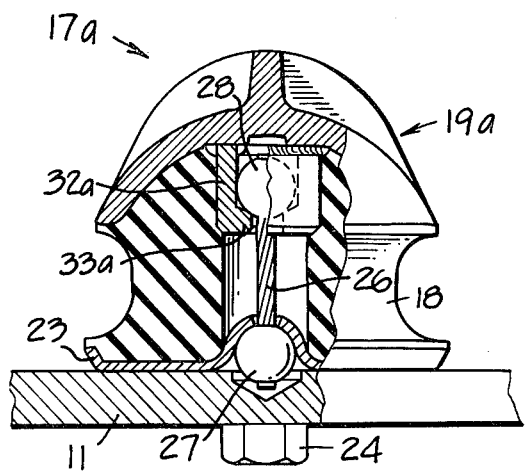
FIG. 5 is a view similar to FIG. 4, but illustrating a first modification of the cushioning lug.

In FIG. 5, a retainer 32a comprises a cup-shaped separate member having its upper end welded or otherwise suitably secured to cap means 19a proper. An annular flange means 33a is formed on a lower end of the retainer to retain ball 28 in the socket defined therein.

Figure 6:
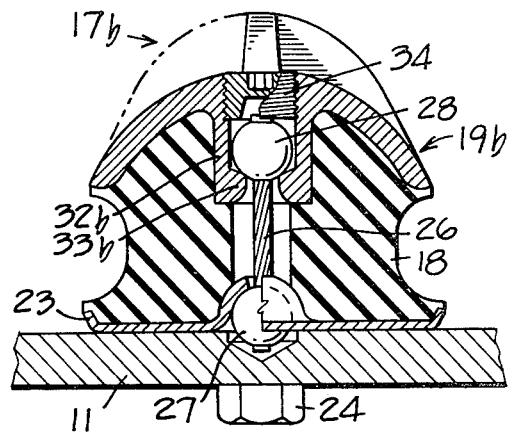
FIG. 6 is a view similar to FIG. 4, but illustrating a second modification of the cushioning lug.

In FIG. 6, an annular retainer 32b is formed integrally with the main body portion of a cap means 17b. A dirt-preventing plug in the form of a set screw 34 is threadably mounted in a threaded counterbore, formed on an upper end of the cap means. Upper ball 28 is supported in the socket defined in retainer 32b by an annular flange means 33b formed on a lower end of the retainer.

Figure 9:
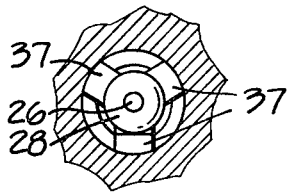
FIG. 9 is a sectional view, taken in the direction of arrows IX—IX in FIG. 7.
Figure 7:
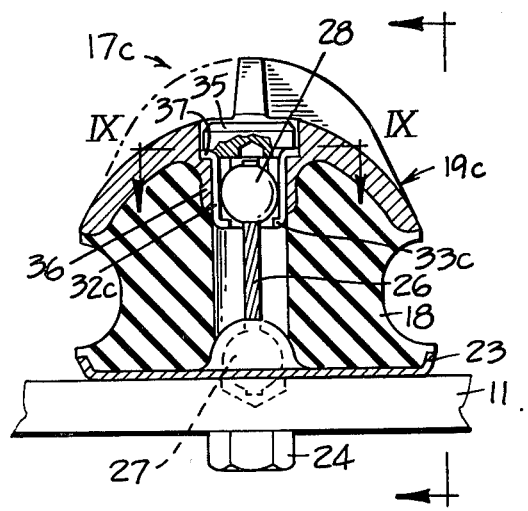
FIG. 7 is a view similar to FIG. 4, but illustrating a third modification of the cushioning lug.
Figure 8:
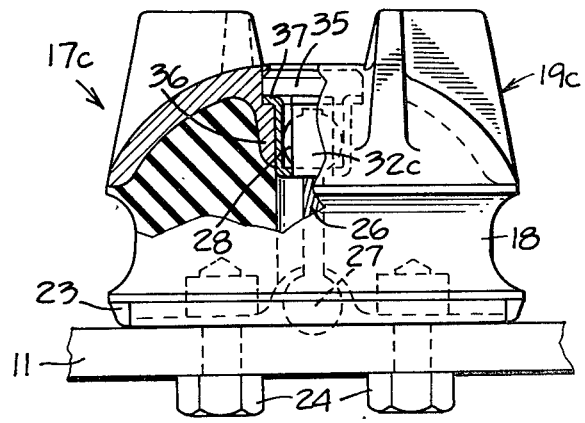
FIG. 8 is an end elevational and partially sectioned view of the FIG. 7 cushioning lug, taken in the direction of arrows VIII—VIII in FIG. 7.
Figure 10:
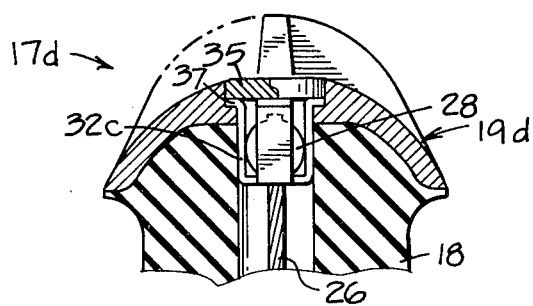
FIG. 10 is a view partially similar to FIG. 4, but illustrating a fourth modification of the cushioning lug.

Referring to FIGS. 7-9, a retainer 32c secured to a cap means 19c comprises a stamped cage-like and cup-shaped member having a plurality of upstanding and circumferentially spaced legs 32c having upper ball 28 mounted therein. An annular dirt-preventing plug 35 is welded or otherwise suitably secured in a counterbore formed in the cap means. Ball 28 is supported by an annular flange means 33c formed on the retainer. The cap means has an annular boss 36 formed integrally thereon and disposed in surrounding relationship relative to retainer 32c to retain it in position with the aid of flanges 37 formed on an upper end of the retainer. The FIG. 10 embodiment 17d essentially differs from the FIGS. 7-9 embodiment 17c in that boss 36 has been eliminated from a cap means 19d.

When placed in operation, each of the above-described cushioning lug means embodiments will function in substantially the same manner. Referring to FIGS. 1-4, for example, when sprocket 16 rotates to drive track assembly 10, each cushioning lug means 17 will engage a respective notch defined between each circumferentially adjacent pair of teeth 15. The universal flexibility of the system will insure optimum bearing contact as between cap means 19 and the sprocket teeth for substantially attenuating the noise level of the track assembly and for continuously maintaining the sprocket teeth in a clean condition of operation.

The embodiments of the invention in which an exclusive property or privilege is claimed are defined as follows:

1. An endless track assembly for a track-type vehicle comprising
   a plurality of track shoes,
   an articulated chain secured to said track shoes comprising a plurality of pivotally interconnected links,
   pin and bushing means pivotally interconnecting adjacent links together and adapted to engage teeth of a drive sprocket for driving said track assembly, and
   cushioning lug means secured to at least some of said track shoes, intermediate adjacent pairs of said pin and bushing means, for attenuating the noise level of said track assembly upon engagement with a drive sprocket, said lug means comprising
   resilient spring means,
   cap means mounted on said spring means and adapted to engage teeth of a drive sprocket, and
   connecting means, comprising a non-rigid, flexible member exhibiting multi-directional flexibility at least substantially throughout the length thereof, attached in tension between a respective one of said track shoes and said cap means for preloading said spring means and for permitting multi-directional movement of said cap means relative to said one track shoe.

2. The endless track assembly of claim 1 wherein said member comprises a flexible cable having first and second anchoring members secured on either end thereof and wherein said first anchoring member is attached to said one track shoe and wherein said second anchoring member is attached to said cap means.

3. The endless track assembly of claim 2 further comprising first and second retainers secured to said one track shoe and to said cap means, respectively, and wherein said first and second anchoring members are disposed in first and second sockets defined in said first and second retainers, respectively.

4. The endless track assembly of claim 3 wherein each of said first and second anchoring members constitutes a ball.

5. The endless track assembly of claim 2 further comprising a mounting plate secured to said track shoe and wherein said first anchoring member is attached to said plate.

6. The endless track assembly of claim 5 wherein said mounting plate has a first retainer thereon defining a first socket therein and wherein said first anchoring member is disposed in said first socket.

7. The endless track assembly of claim 6 wherein said cap means has a second retainer thereon defining a second socket therein and wherein said second anchoring member is disposed in said second socket.

8. The endless track assembly of claim 7 wherein said second anchoring member is spherical and wherein said second socket is semi-spherical.

9. The endless track assembly of claim 3 further comprising annular flange means formed on a lower end of said second retainer for preventing said second anchoring member from moving thereby.

10. The endless track assembly of claim 3 wherein said second retainer is annular and is formed integrally with said cap means.

11. The endless track assembly of claim 9 wherein said cap means constitutes a one-piece construction and covers said second socket for preventing upward movement of said second anchoring member therepast.

12. The endless track assembly of claim 3 wherein said second retainer constitutes a separate cup-shaped member secured to said cap means and defining said second socket therein.

13. The endless track assembly of claim 3 further comprising a set screw threadably mounted in said cap means for closing an upper end of said second socket.

14. The endless track assembly of claim 13 wherein said second retainer constitutes a cage-like member having a plurality of circumferentially spaced legs and at least one flange formed on an upper end of said cage-like member and disposed on said cap means.

15. The endless track assembly of claim 14 further comprising an annular plug secured on said cap means in covering relationship relative to said second socket.

16. The endless track assembly of claim 5 wherein said spring means comprises an elastomeric block bonded to said cap means and to said mounting plate.

17. A cushioning lug adapted to be secured to a track shoe for attenuating the noise level of a track assembly comprising
   resilient spring means,
   cap means mounted on said spring means and adapted to engage teeth of a drive sprocket,
   a mounting plate having said spring means disposed thereon, and
   connecting means, comprising a non-rigid, flexible member exhibiting multi-directional flexibility at least substantially throughout the length thereof, attached in tension between said cap means and said mounting plate for preloading said spring means and for permitting multi-directional movement of said cap means relative to said mounting plate.

18. The cushioning lug of claim 17 wherein said spring means comprises an elastomeric block bonded to said cap means and to said mounting plate.

19. The cushioning lug of claim 17 wherein said member comprises a flexible cable having first and second anchoring members secured on either end thereof and wherein said first anchoring member is attached to said mounting plate and wherein said second anchoring member is attached to said cap means.

20. The cushioning lug of claim 19 further comprising first and second retainers secured to said mounting plate and to said cap means, respectively, and wherein said first and second anchoring members are disposed in first and second sockets defined in said first and second retainers, respectively.

21. The cushioning lug of claim 20 wherein each of said first and second anchoring members constitutes a ball.

22. The cushioning lug of claim 20 further comprising annular flange means formed on a lower end of said second retainer for preventing said second anchoring member from moving thereby.

23. The cushioning lug of claim 20 wherein said second retainer is annular and is formed integrally with said cap means.

24. The cushioning lug of claim 23 wherein said cap means constitutes a one-piece construction and covers said second socket means for preventing upward movement of said second anchoring member.

25. The cushioning lug of claim 20 wherein said second retainer constitutes a separate cup-shaped member secured to said cap means and defining said second socket therein.

26. The cushioning lug of claim 20 further comprising a set screw threadably mounted in said cap means for closing an upper end of said second socket.

27. The cushioning lug of claim 25 wherein said second retainer constitutes a cage-like member having a plurality of circumferentially spaced legs and at least one formed on an upper end of said cage-like member and disposed on said cap means.

28. The cushioning lug of claim 27 further comprising an annular plug secured on said cap means in covering relationship relative to said second socket.

* * * * *

UNITED STATES PATENT OFFICE
CERTIFICATE OF CORRECTION

Patent No. 4,150,858　　　　　　　Dated　　April 24, 1979

Inventor(s)　　LAWRENCE E. FOX et al

It is certified that error appears in the above-identified patent and that said Letters Patent are hereby corrected as shown below:

Col. 6, Claim 27, line 33, after "one" and before "formed" insert --flange--.

Signed and Sealed this

Sixteenth Day of October 1979

[SEAL]

Attest:

RUTH C. MASON
Attesting Officer

LUTRELLE F. PARKER
Acting Commissioner of Patents and Trademarks